United States Patent [19]

Sydansk et al.

[11] Patent Number: 4,744,419

[45] Date of Patent: * May 17, 1988

[54] CONFORMANCE IMPROVEMENT IN A SUBTERRANEAN HYDROCARBON-BEARING FORMATION USING A CROSSLINKED POLYMER

[75] Inventors: Robert D. Sydansk, Littleton; Perry A. Argabright, Larkspur, both of Colo.

[73] Assignee: Marathon Oil Company, Findlay, Ohio

[*] Notice: The portion of the term of this patent subsequent to Aug. 4, 2004 has been disclaimed.

[21] Appl. No.: 939,666

[22] Filed: Dec. 9, 1986

Related U.S. Application Data

[63] Continuation-in-part of Ser. No. 822,709, Jan. 27, 1986, Pat. No. 4,683,949, which is a continuation-in-part of Ser. No. 807,416, Dec. 10, 1985, abandoned.

[51] Int. Cl.$^4$ ............................................. E21B 33/138
[52] U.S. Cl. .................................. 166/270; 166/294; 166/295
[58] Field of Search ............... 166/270, 294, 295, 300; 405/264; 523/130, 132

[56] References Cited

U.S. PATENT DOCUMENTS

| | | | |
|---|---|---|---|
| Re. 32,114 | 4/1986 | Argabright et al. | 166/252 |
| 3,114,651 | 12/1963 | Gentile | 117/6 |
| 3,383,307 | 5/1968 | Goetz | 252/316 |
| 3,658,129 | 4/1972 | Lanning et al. | 166/270 |
| 3,762,476 | 10/1973 | Gall | 166/294 |
| 3,833,061 | 9/1974 | Gall | 166/294 |
| 3,926,258 | 12/1975 | Hessert et al. | 166/294 |
| 3,949,811 | 4/1976 | Threlkeld et al. | 166/294 |
| 3,978,928 | 9/1976 | Clampitt | 166/294 |
| 3,981,363 | 9/1976 | Gall | 166/270 |
| 4,018,286 | 4/1977 | Gall et al. | 166/295 |
| 4,039,029 | 8/1977 | Gall | 166/294 |
| 4,069,869 | 1/1978 | Sandiford | 166/270 |
| 4,193,453 | 3/1980 | Golinkin | 166/295 |
| 4,488,601 | 12/1984 | Hammett | 166/270 |
| 4,498,539 | 2/1985 | Bruning | 166/294 |
| 4,606,407 | 8/1986 | Shu | 166/270 |
| 4,644,073 | 2/1987 | Mumallah et al. | 252/8.554 X |

OTHER PUBLICATIONS

Von Erdman, "Condensation of Mononuclear Chromium (III) Salts to Polynuclear Compounds," *Das Leder*, Eduard Roether Verlag, Darmstadt, Germany, 1963, vol. 14 pp. 249–266.

Udy, Marvin J., Chromium, vol. 1: *Chemistry of Chromium and Its Compounds*, Reinhold Publishing Corp., N.Y., 1956, pp. 229–233.

Cotton and Wilkinson, *Advanced Inorganic Chemistry* 3rd Ed., John Wiley & Sons, Inc., N.Y., 1972, pp. 836–839.

Shuttleworth and Russel, *Journal of The Society of Leather Trades' Chemists*, "The Kinetics of Chrome Tannage Part I.," United Kingdom, 1965, vol. 49, pp. 133–154.

Shuttleworth and Russel, *Journal of The Society of Leather Trade's Chemists*, "Part III.," United Kingdom, 1965, vol. 49, pp. 251–260.

Shuttleworth and Russel, *Journal of The Society of Leather Trades' Chemists*, "Part IV.," United Kingdom, 1965, vol. 49, pp. 261–268.

*Primary Examiner*—George A. Suchfield
*Attorney, Agent, or Firm*—Jack L. Hummel; Rodney F. Brown

[57] ABSTRACT

Conformance improvement is achieved in a subterranean hydrocarbon-bearing formation using a gel comprising a high molecular weight, water-soluble, carboxylate-containing polymer, a chromium III/carboxylate complex capable of crosslinking the polymer and an aqueous solvent. The gel components are combined at the surface and injected into the desired treatment zone via a wellbore to form a continuous single-phase gel.

32 Claims, No Drawings

4,744,419

CONFORMANCE IMPROVEMENT IN A SUBTERRANEAN HYDROCARBON-BEARING FORMATION USING A CROSSLINKED POLYMER

This is a continuation-in-part application of copending application Ser. No. 822,709 filed on Jan. 27, 1986, now U.S. Pat. No. 4,683,949 which is a continuation-in-part application of application Ser. No. 807,416 filed on Dec. 10, 1985, now abandoned.

BACKGROUND OF THE INVENTION

1. Technical Field:

The invention relates to a process for reducing the permeability in a relatively high permeability region of a subterranean hydrocarbon-bearing formation and more particularly to a process for improving areal and vertical conformance and flow profiles at or away from a production and/or injection wellbore penetrating the hydrocarbon-bearing formation.

2. Description of Related Art:

Poor vertical conformance results from the vertical juxtaposition of relatively high permeability geologic zones to relatively low permeability zones within a subterranean formation. Poor areal conformance results from the presence of high permeability streaks and high permeability anomalies within the formation matrix, such as vertical fractures and networks of the same, which have very high permeability relative to the formation matrix. Fluids generally exhibit poor flow profiles and sweep efficiencies in subterranean formations having poor vertical or areal conformance. Poor conformance is particularly a problem where vertical heterogeneity and/or fracture networks or other structural anomalies are in fluid communication with a subterranean wellbore across which fluids are injected or produced.

A number of attempts to remedy conformance problems exist. U.S. Pat. Nos. 3,762,476; 3,981,363; 4,018,286; and 4,039,029 to Gall or Gall et al describe various processes wherein gel compositions are formed in high permeability zones of subterranean formations to reduce the permeability therein. According to U.S. Pat. No. 3,762,476, a polymer such as polyacrylamide is injected into a formation followed sequentially by a crosslinking agent. The sequentially injected slugs are believed to permeate the treatment zone of the formation and gel in situ.

It is generally held that effective polymer/crosslinking agent systems necessitate sequential injection of the gel components because gel systems mixed on the surface often set up before they can effectively penetrate the treatment region. However, in practice, treatments such as that disclosed in U.S. Pat. No. 3,762,476 using sequentially injected gel systems have proven unsatisfactory because of the inability to achieve complete mixing and gelation in the formation. As a result, gels only form at the interface of the unmixed gel components and often in regions remote from the desired treatment region. A need exists for a gelation process capable of forming gels having a predetermined gelation rate, strength, and stability to satisfy the particular demands of a desired treatment region in a subterranean hydrocarbon-bearing formation.

SUMMARY OF THE INVENTION

The present invention provides a process for improving vertical and areal conformance in a subterranean hydrocarbon-bearing formation penetrated by a production and/or injection well and for correspondingly improving flow profiles and sweep efficiencies of injected and/or produced fluids in the formation. The objectives are achieved by means of a tailor-made flowing or non-flowing polymer gel.

The gel comprises a high molecular weight, carboxylate-containing polymer and a chromic carboxylate crosslinking agent. The gel is prepared by forming a gelation solution above ground containing the polymer and crosslinking agent and injecting the solution into the desired treatment region via a wellbore in fluid communication therewith. The gelation solution is advantageously at least partially gelled by the time it reaches the treatment region to inhibit or prevent its propagation into adjoining regions where no treatment is desired. The final gel is a continuous single-phase gel which substantially reduces permeability in the treatment region.

After the gelation treatment, fluids may be injected into or produced from the hydrocarbon-bearing regions of the formation in the fluid communication with the wellbore. The gel is substantially incapable of flowing from the treatment region and is substantially permanent and resistant to in situ degradation.

The process provides distinct advantages over gelation processes known in the art. The practitioner of the present invention customizes or tailors a gel to a specific subterranean application by first determining the treatment demands of a desired subterranean region. Given these treatment demands, one can predetermine the gelation rate and resultant gel strength and stability which are required of a gel to meet the demands. Thereafter, a gel having the required predetermined properties is produced under controlled conditions at the surface by utilizing observed correlations between specific controllable gelation parameters and resultant gel properties.

DESCRIPTION OF THE PREFERRED EMBODIMENTS

The present invention is described in the context of specific terms which are defined as follows. The formation consists of two general regions, the "matrix" and "anomalies." An "anomaly" is a volume or void space in the formation having very high permeability relative to the matrix. It is inclusive of terms such as streaks, fractures, fracture networks, vugs, solution channels, caverns, washouts, cavities, etc. The "matrix" is substantially the remainder of the formation volume characterized as essentially homogeneous, continuous, sedimentary reservoir material free of anomalies and often competent.

The matrix consists of horizontal "zones" of distinctive subterranean material of continuous geologic properties which extend in the horizontal direction. "Vertical conformance" is a measure of the degree of geologic uniformity in permeability as one moves vertically across the formation. "Areal conformance" is a measure of the degree of geologic uniformity in permeability as one moves horizontally across the formation. A "flow profile" qualitatively describes the uniformity of fluid flow through a subterranean formation while "sweep efficiency" is the quantitative analog of "flow profile."

"Plugging" is a substantial reduction in permeability in a region of a formation.

The term "gel" as used herein is directed to a continuous three-dimensional crosslinked polymeric network having an ultra high molecular weight. The gel contains a liquid medium such as water which is confined within the solid polymeric network. The fusion of a liquid and a solid component into a single-phase system provides the gel with a unique phase behavior. Gels employed by the present invention have sufficient structure so as not to propagate from the confines of a plugged volume into a less permeable region of the formation adjoining the volume when injected into the volume.

The gel is qualitatively defined as "flowing" or "non-flowing" based on its ability to flow under the force of gravity when unconfined on the surface at ambient atmospheric conditions. A flowing gel flows under these conditions; a non-flowing gel does not. Nonetheless, both a non-flowing gel and a flowing gel are defined herein as having sufficient structure so as not to propagate from the confines of the desired treatment region into a less permeable adjoining region when injected into the subterranean treatment region.

"Partially gelled" solutions are also referred to herein. A partially gelled solution is at least somewhat more viscous than an uncrosslinked polymer solution such that it is incapable of entering a less permeable region where no treatment is desired, but sufficiently fluid such that it is capable of displacement into a desired treatment zone. The crosslinking agent of the partially gelled solution has reacted incompletely with the polymer with the result that neither all of the polymer nor all of the crosslinking agent in the gelation solution is totally consumed by the crosslinking reaction. The partially gelled solution is capable of further crosslinking to completion resulting in the desired gel without the addition of more crosslinking agent.

"Crosslinked to completion" means that the gel composition is incapable of further crosslinking because one or both of the required reactants in the initial solution are consumed. Further crosslinking is only possible if either polymer, crosslinking agent, or both are added to the gel composition.

The gel composition utilized in the present invention is comprised of a carboxylate-containing polymer and a crosslinking agent. The carboxylate-containing polymer may be any crosslinkable, high molecular weight, water-soluble, synthetic polymer or biopolymer containing one or more carboxylate species. The average molecular weight of the carboxylate-containing polymer is in the range of about 10,000 to about 50,000,000 and preferably about 100,000 to about 20,000,000, and most preferably about 200,000 to about 15,000,000.

Biopolymers useful in the present invention include polysaccharides and modified polysaccharides. Exemplary biopolymers are xanthan gum, guar gum, carboxymethylcellulose, o-carboxychitosans, hydroxyethylcellulose, hydroxypropylcellulose, and modified starches. Useful synthetic polymers include inter alia acrylamide polymers, such as polyacrylamide, partially hydrolyzed polyacrylamide and terpolymers containing acrylamide, acrylate, and a third species. As defined herein, polyacrylamide (PA) is an acrylamide polymer having substantially less than 1% of the acrylamide groups in the form of carboxylate groups. Partially hydrolyzed polyacrylamide (PHPA) is an acrylamide polymer having at least 1%, but not 100%, of the acrylamide groups in the form of carboxylate groups. The acrylamide polymer may be prepared according to any conventional method known in the art, but preferably has the specific properties of acrylamide polymer prepared according to the method disclosed by U.S. Pat. No. Re. 32,114 to Argabright et al incorporated herein by reference.

The crosslinking agent is a chromic carboxylate complex. The term "complex" is defined herein as an ion or molecule containing two or more interassociated ionic, radical or molecular species. A complex ion as a whole has a distinct electrical charge while a complex molecule is electrically neutral. The term "chromic carboxylate complex" encompasses a single complex, mixtures of complexes containing the same carboxylate species, and mixtures of complexes containing differing carboxylate species.

The complex of the present invention includes at least one or more electropositive chromium III species and one or more electronegative carboxylate species. The complex may advantageously also contain one or more electronegative hydroxide and/or oxygen species. It is believed that, when two or more chromium III species are present in the complex, the oxygen or hydroxide species may help to bridge the chromium III species. Each complex optionally contains additional species which are not essential to the polymer crosslinking function of the complex. For example, inorganic mono- and/or divalent ions, which function merely to balance the electrical charge of the complex, or one or more water molecules may be associated with each complex. Representative formulae of such complexes include:

$[Cr_3(CH_3CO_2)_6(OH)_2]^{+1}$;

$[Cr_3(OH)_2(CH_3CO_2)_6]NO_3 \cdot 6H_2O$;

$[Cr_3(H_2O)_2(CH_3CO_2)_6]^{+3}$;

$[Cr_3(H_2O)_2(CH_3CO_2)_6](CH_3CO_2)_3 \cdot H_2O$;

etc.

Trivalent chromium and chromic ion are equivalent terms encompassed by the term chromium III species as used herein. The carboxylate species are advantageously derived from water-soluble salts of carboxylic acids, especially low molecular weight mono-basic acids. Carboxylate species derived from salts of formic, acetic, propionic, and lactic acid, lower substituted derivatives thereof and mixtures thereof are especially preferred. The carboxylate species include the following water-soluble species: formate, acetate, propionate, lactate, lower substituted derivatives thereof, and mixtures thereof. The optional inorganic ions include sodium, sulfate, nitrate and chloride ions.

A host of complexes of the type described above and their method of preparation are well known in the leather tanning art. These complexes are described in Shuttleworth and Russel, *Journal of the Society of Leather Trades' Chemists*, "The Kinetics of Chrome Tannage Part I.," United Kingdom, 1965, v. 49, p. 133-154; "Part III.," United Kingdom, 1965, v. 49, p. 251-260; "Part IV.," United Kingdom, 1965, v. 49, p. 261-268; and Von Erdman, *Das Leder*, "Condensation of Mononuclear Chromium (III) Salts to Polynuclear Compounds," Eduard Roether Verlag, Darmstadt, Germany, 1963, v. 14, p. 249; and incorporated herein by reference. Udy, Marvin J., *Chromium, Volume 1: Chemistry of Chromium and its Compounds*, Reinhold Publishing Corp., N.Y., 1956, pp. 229-233; and Cotton and Wilkinson, *Advanced Inorganic Chemistry 3rd Ed.*, John Wiley & Sons, Inc., N.Y., 1972, pp. 836-839, further describe typical complexes which may be within the scope of the present invention and are incorporated herein by reference. The present invention is not limited to the specific complexes and mixtures thereof described in the references, but may include others satisfying the above-stated definition.

The gel is formed by admixing the carboxylate-containing polymer and the crosslinking agent at the surface to form an injectable gelation solution. Surface admixing broadly encompasses inter alia mixing the solution in bulk at the surface prior to injection or simultaneously mixing the solution at or near the wellhead by in-line mixing means while injecting it. Admixing is accomplished for example by dissolving the starting materials for the crosslinking agent in an appropriate aqueous solvent. Exemplary starting materials include solid $CrAc_3 \cdot H_2O$, solid $Cr_3Ac_7(OH)_2$ or a solution labeled "Chromic Acetate 50% Solution" commercially available, for example, from McGean Chemical Co., Inc., 1250 Terminal Tower, Cleveland, Ohio 44113, U.S.A. The crosslinking agent solution is then mixed with an aqueous polymer solution to produce the gelation solution. Among other alternatives, the starting materials for the crosslinking agent can be dissolved directly in the aqueous polymer solution to form the gelation solution in a single step.

The aqueous solvent of the gelation solution may be fresh water or a brine having a total dissolved solids concentration up to the solubility limit of the solids in water. Inert fillers such as crushed or naturally fine rock material or glass beads can also be added to the gelation solution to reinforce the gel network structure.

The present process enables the practitioner to customize or tailor-make a gel having a predetermined gelation rate and predetermined gel properties of strength and stability from the above-described composition. The gelation rate is defined as the degree of gel formation as a function of time or, synonymously, the rate of crosslinking in the gelation solution. The degree of crosslinking may be quantified in terms of gel viscosity and/or strength. Gel strength of a non-flowing gel is defined as the coherence of the gel network or resistance to deformation under external forces. Gel strength of a flowing gel is defined as the resistance of the gel to filtration or flow. Stability is defined as either thermal or phase stability. Thermal stability is the ability of a gel to withstand temperature extremes without degradation. Phase stability is the ability of a gel to resist syneresis which can detract from the gel structure and performance.

Tailor-making or customizing a gel in the manner of the present invention to meet the demands of a particular treatment region is provided in part by correlating the independent gelation parameters with the dependent variables of gelation rate and resultant gel strength and stability. The independent gelation parameters are the surface and in situ gelation conditions including: temperature, pH, ionic strength and specific electrolytic makeup of the solvent, polymer concentration, ratio of the weight of polymer to the combined weight of chromium III and carboxylate species in the mixture, degree of polymer hydrolysis, and average molecular weight of the polymer.

The operable ranges of the gelation parameters are correlated with the dependent variables of gelation rate and resultant gel properties by means including qualitative bottle testing, quantitative viscosimetric analysis, packed-column flooding, and core flooding. The operable ranges of a number of gelation parameters and their correlation with the dependent variables are described below.

The lower temperature limit of the gelation solution at the surface is the freezing point of the solution and the upper limit is essentially the thermal stability limit of the polymer. The solution is generally maintained at ambient temperature or higher at the surface. The temperature may be adjusted by heating or cooling the aqueous solvent. Increasing the temperature within the prescribed range increases the gelation rate.

The initial pH of the gelation solution is within a range of about 3 to 13 and preferably about 6 to 13. Although gelation can occur at an acidic pH, lowering the initial pH of the solution below 7 does not favor gelation. The initial pH of the solution is most preferably alkaline, i.e., greater than 7 to about 13. Increasing the pH within the prescribed range increases the rate of gelation.

The polymer concentration in the solution is about 500 ppm up to the solubility limit of the polymer in the solvent or the rheological constraints of the polymer solution, preferably about 1000 to about 200,000 ppm, and most preferably about 3000 to about 100,000. Increasing the polymer concentration increases the gelation rate and ultimate gel strength at a constant ratio of polymer to crosslinking agent.

The ionic strength of the solvent can be from that of deionized distilled water to that of a brine having an ion concentration approaching the solubility limit of the brine. Increasing the ionic strength of the solution can increase the gelation rate.

The weight ratio of polymer to chromium III and carboxylate species comprising the mixture is about 1:1 to about 500:1, preferably about 2.5:1 to about 100:1, and most preferably about 5:1 to about 40:1. Decreasing the ratio generally increases the gelation rate and up to a certain point generally increases the gel strength, especially at a constant high polymer concentration.

When an acrylamide polymer is employed, the degree of hydrolysis is about 0 to 60% and preferably about 0 to 30%. Within the preferred range, increasing the degree of hydrolysis increases the gelation rate. Increasing the molecular weight of the polymer increases the gel strength.

It is apparent from these correlations that one can produce gels across a very broad range of gelation rates and gel properties as a function of the gelation conditions. Thus, to effect an optimum gelation treatment according to the present process, the practitioner predetermines the gelation rate and properties of the resultant gel which meet the treatment demands of the given region and thereafter produces the gel having these predetermined characteristics. The treatment demands include the in situ gelation conditions such as temperature, connate water properties, and permeability of the region as well as the post treatment conditions such as injection and production pressures. Analytical methods known to one skilled in the art are used to determine the treatment demands. The treatment demands provide criteria to predetermine the gelation rate and resultant gel properties in the manner described above and continuing hereafter.

The gelation rate is advantageously sufficiently slow to enable preparation of the gelation solution at the surface, injection of the solution as a uniform slug into the wellbore, and displacement of the entire solution into the desired treatment zone. Too rapid a gelation rate produces excessive gelation of the solution at the surface which results in a solution that may be difficult, if not impossible, to inject into the wellbore or formation due to its rheological properties. At the same time, the gelation rate must be sufficiently rapid to enable completion of the reaction within a reasonable period of time so that the well may be returned to injection or production after treatment.

When treating anomalies, at least partial gelation of the solution, if not complete gelation for some flowing gels, is advantageous before the solution reaches the face bounding the matrix and the anomaly to prevent the solution from penetrating the matrix as well as the anomaly. Substantial penetration of the matrix by the solution and the ensuing permeability reduction of the matrix are counterproductive to the plugging of anomalies. The values of the independent variables in the process are carefully selected to achieve a gelation rate meeting these criteria.

The volume of solution injected into the formation is a function of the volume and location of the desired treatment region and the degree of penetration into the treatment region by the solution. One skilled in the art can determine the required volume of gel for a given treatment region. Placement of the gelation solution in the treatment region may be facilitated by zone isolation means such as packers and the like.

The injection rate is a function of the gelation rate and operational constraints of injection pressure and pumping limits. The required injection rate is fixed such that all of the solution can be practically injected into the treatment zone before it becomes unpumpable. The gelation time of the gel ranges from near instantaneous for flowing gels up to 48 hours or longer for both flowing and non-flowing gels. Longer gelation times are limited by practical considerations of lost production when injection and production wells are shut in.

The process is applicable to conformance treatment of formations under most conditions and is specific to treating regions within the formation which are in fluid communication with an injection or production well. The flowing gel is especially applicable to the treatment of anomalies such as streaks of relatively high permeability, fractures or fracture networks in direct communication via the anomaly with an injection well but not also in direct communication via the anomaly with a production well. The ultimate gel is termed a flowing gel as defined herein because it would flow if unconfined on the surface. However, the flowing gel is sufficiently crosslinked to remain in place under injection conditions in the anomaly when confined thereby. Thus, the flowing gel is capable of effectively plugging the anomaly.

The flowing gel is not generally suitable for treatment of anomalies in direct communication via the anomaly with production wells because flowing gels do not have sufficient strength to withstand the drawdown pressure during production and may flow back into the wellbore. For treatment of anomalies in direct communication with production wells, non-flowing rigid gels having sufficient strength to withstand the production drawdown pressure are preferred. It is preferred that substantially none of the gel flows back into the wellbore when oil is produced after the conformance treatment.

In some specialized cases, the degree of partial gelation of the injected solution can be maintained sufficiently low to enable the solution to enter a selected high permeability zone of the matrix and crosslink to completion in situ as either a non-flowing gel or a flowing gel. Both flowing and non-flowing gels can be used for treatment of high permeability zones of the matrix because in general neither will flow from the treatment zone upon complete gelation, a necessary condition for the present invention. However, non-flowing gels are preferred for treatment of high permeability zones in direct communication with production wells because of their increased strength.

Gels having a predetermined gelation rate and resultant gel properties to meet the treatment demands of a given region are produced by adjusting and setting the surface gelation conditions as they correlate to the gelation rate and gel properties. Accordingly the gels are produced in a manner which renders them insensitive to most extreme formation conditions. The gels can be applied to the treatment of many different geological structures including high permeability zones within the formation matrix and anomalies external to the matrix such as fractures and other cavities. The gels can be stable at formation temperatures as high as 115° C. and at any formation pH contemplated. The gels are relatively insensitive to the stratigraphy of the rock and can be employed in carbonate and sandstone strata and unconsolidated or consolidated strata having varying mineralogy. Once the gels are in place, it is extremely difficult to displace the gels by physical or chemical means other than total destruction of the crosslinked network. The gels may be reversible on contact with hydrogen peroxide or sodium hypochlorite, but are substantially insoluble in the formation fluids.

The following examples demonstrate the practice and utility of the present invention but are not to be construed as limiting the scope thereof.

EXAMPLES

The examples are formatted as a table of data which describe the formulation and maturation of several gels. Each gel is represented in the table by a single horizontal entry. Data include the conditions for producing the gel and the qualitative strength of the produced gel.

The following gel strength code and nomenclature are useful for interpreting the table.

GEL STRENGTH CODE

A: No detectable gel formed: the bulk of the solution appears to have the same viscosity as the original polymer solution, although isolated local gel balls may be present.

B: Highly flowing gel: the gel appears to be only slightly more viscous than the initial polymer solution.

C: Flowing gel: most of the gel flows to the bottle cap by gravity upon inversion.

D: Moderately flowing gel: only a small portion (5–10%) of the gel does not readily flow to the bottle cap by gravity upon inversion (usually characterized as a tonguing gel).

E: Barely flowing gel: the gel can barely flow to the bottle cap and/or a significant portion (>15%) of the gel does not flow by gravity upon inversion.

F: Highly deformable nonflowing gel: the gel does not flow to the bottle cap by gravity upon inversion.

G: Moderately deformable nonflowing gel: the gel deforms about half way down the bottle by gravity upon inversion.

H: Slightly deformable nonflowing gel: only the gel surface slightly deforms by gravity upon inversion.

I: Rigid gel: there is no gel surface deformation by gravity upon inversion.

J: Ringing rigid gel: a tuning fork-like mechanical vibration can be felt upon tapping the bottle.

NOMENCLATURE

Polymer: chemical name of polymer
Polymer MW: average molecular weight of the polymer
Polymer Conc: polymer concentration in the polymer solution (ppm)
Polymer Solvent: aqueous solvent of the polymer solution (Fresh=Denver Tap Water; Brine=5000 ppm NaCl, 200 ppm $CaCl_2$)
Weight Ratio Polymer: Ions: weight ratio of polymer to crosslinking agent in the gelation solution
Time: gelation time (days)
Gel Code: gel strength code.

The polymer solutions of the following examples are prepared by diluting aqueous polymer solutions with an aqueous solvent. The dilute polymer solution is combined with the crosslinking agent solution in a wide-mouth bottle to form a sample. The sample is gelled in the capped bottle at 50° C. and the qualitative gel strength is determined by periodically inverting the bottle. In all of the examples, the crosslinking agent solution is that of the present invention (i.e., a complex or mixture of complexes comprising chromium III and acetate ions).

also favored by increased molecular weight of the polymer and choice of solvent.

The examples of copending parent application, Ser. No. 822,709, filed on Jan. 27, 1986, are incorporated herein by reference.

While foregoing preferred embodiments of the invention have been described and shown, it is understood that all alternatives and modifications, such as those suggested and others, may be made thereto and fall within the scope of the invention.

We claim:

1. A process for substantially plugging at least one relatively high permeability region bounded by at least one relatively low permeability region in a hydrocarbon-bearing formation below an earthen surface, said formation penetrated by a wellbore in fluid communication with said at least one relatively high permeability region, the process consisting essentially of the steps of:
    (a) preparing a gelation solution at the surface consisting essentially of a water-soluble carboxylate-containing polymer, a complex capable of crosslinking said polymer and formed of at least one electropositive chromium III species and at least one electronegative carboxylate species, and a solvent for said polymer and said complex;
    (b) injecting said gelation solution into said wellbore;
    (c) displacing said gelation solution into said at least one relatively high permeability region; and
    (d) crosslinking said gelation solution substantially to completion in said at least one relatively high permeability region to form a crosslinked gel which substantially plugs said at least one relatively high permeability region.

2. The process of claim 1 wherein said gelation solu-

TABLE OF EXAMPLES

| Run No. | Polymer | Polymer MW | Polymer Conc. | Polymer Solvent | Weight Ratio Polymer:Ions | Time | Gel Code |
|---|---|---|---|---|---|---|---|
| 1 | PHPA-1 | 11,000,000 | 5000 | Fresh | 10 | 7 | D |
| 2 | PHPA-1 | 11,000,000 | 5000 | Fresh | 20 | 7 | C |
| 3 | PHPA-2 | 3,000,000 | 5000 | Fresh | 10 | 7 | A |
| 4 | PHPA-2 | 3,000,000 | 7500 | Fresh | 10 | 7 | C |
| 5 | Guar Gum | 500,000 | 5000 | Fresh | 20 | 24 | A |
| 6 | Guar Gum | 500,000 | 10,000 | Fresh | 20 | 17 | B |
| 7 | Poly (methylvinyl ether/maleic anhydride) | 80,000 | 5000 | Fresh | 10 | 14 | A |
| 8 | Poly (methylvinyl ether/maleic anhydride) | 80,000 | 10,000 | Fresh | 40 | 20 | B |
| 9 | Xanthan Gum | 1,500,000 | 5000 | Fresh | 10 | 5 | A |
| 10 | Xanthan Gum | 1,500,000 | 8000 | Fresh | 10 | 12 | B |
| 11 | Xanthan Gum | 1,500,000 | 5000 | Brine | 10 | 12 | C |
| 12 | Xanthan Gum | 1,500,000 | 8000 | Brine | 10 | 12 | C |
| 13 | Carboxymethyl-cellulose | 700,000 | 5000 | Brine | 20 | 0.2 | F |
| 14 | Carboxymethyl-cellulose | 700,000 | 5000 | Brine | 10 | 0.2 | F |
| 15 | Carboxymethyl-cellulose | 700,000 | 5000 | Fresh | 20 | 0.2 | F |
| 16 | Carboxymethyl- | 700,000 | 5000 | Fresh | 10 | 0.2 | F |

PHPA-1 is produced according to the process of U.S. Pat. No. Re. 32,114 while PHPA-2 is not. Both polymers are 30% hydrolyzed.

The data of the Table show that gels can be produced from a number of carboxylate-containing polymers whether synthetic polymers or biopolymers. Although the strength of the gels appears weak in many cases, the gels can be strengthened by increasing the reactant concentrations. The data indicate that gel strength is tion is partially gelled upon injection such that said gelation solution is sufficiently flowing to penetrate said at least one relatively high permeability region but is sufficiently gelled to prevent substantial penetration of said at least one relatively low permeability region.

3. The process of claim 1 wherein said carboxylate species is selected from the group consisting of formate, acetate, propionate, lactate, lower substituted derivatives thereof, and mixtures thereof.

4. The process of claim 1 wherein said gelation solution is substantially ungelled upon injection.

5. The process of claim 1 wherein said at least one relatively high permeability region is an anomaly and said at least one relatively low permeability region is a matrix.

6. The process of claim 1 wherein said at least one relatively high permeability region is a first zone of a matrix and said at least one relatively low permeability region is a second zone of a matrix.

7. The process of claim 1 wherein said carboxylate-containing polymer is a biopolymer.

8. The process of claim 1 wherein said carboxylate-containing polymer is an acrylamide polymer having an average molecular weight of about 2 million to about 10 million and a molecular weight distribution of about 0.02 to about 0.22 as determined by the ratio of $\sigma/\overline{M}$ wherein $\sigma$ is the standard deviation of molecular weight of abundance of a molecular species present in the polymer and $\overline{M}$ is the average molecular weight of the polymer.

9. A process for substantially plugging at least one relatively high permeability region bounded by at least one relatively low permeability region in a hydrocarbon-bearing formation below an earthen surface, said formation penetrated by a wellbore in fluid communication with said at least one relatively high permeability region, the process consisting essentially of the steps of:
(a) preparing a gelation solution at the surface consisting essentially of a water-soluble carboxylate-containing polymer, a complex capable of crosslinking said polymer and formed of at least one electropositive chromium III species, at least one electronegative carboxylate species, and at least one species selected from the group consisting of electronegative oxygen species, electronegative hydroxide species, inorganic monovalent ions, inorganic divalent ions, water molecules, and mixtures thereof, and a solvent for said polymer and said complex;
(b) injecting said gelation solution into said wellbore;
(c) displacing said gelation solution into said at least one relatively high permeability region; and
(d) crosslinking said gelation solution substantially to completion in said at least one relatively high permeability region to form a crosslinked gel which substantially plugs said at least one relatively high permeability region.

10. The process of claim 9 wherein said gelation solution is partially gelled upon injection such that said gelation solution is sufficiently flowing to penetrate said at least one relatively high permeability region but is sufficiently gelled to prevent substantial penetration of said at least one relatively low permeability region.

11. The process of claim 9 wherein said carboxylate species is selected from the group consisting of formate, acetate, propionate, lactate, lower substituted derivatives thereof, and mixtures thereof.

12. The process of claim 9 wherein said gelation solution is substantially ungelled upon injection.

13. The process of claim 9 wherein said at least one relatively high permeability region is an anomaly and said at least one relatively low permeability region is a matrix.

14. The process of claim 9 wherein said at least one relatively high permeability region is a first zone of a matrix and said at least one relatively low permeability region is a second zone of a matrix.

15. The process of claim 9 wherein said carboxylate-containing polymer is a biopolymer.

16. The process of claim 9 wherein said carboxylate-containing polymer is an acrylamide polymer having an average molecular weight of about 2 million to about 10 million and a molecular weight distribution of about 0.02 to about 0.22 as determined by the ratio of $\sigma/\overline{M}$ wherein $\sigma$ is the standard deviation of molecular weight of abundance of a molecular species present in the polymer and $\overline{M}$ is the average molecular weight of the polymer.

17. A process for substantially reducing the permeability of at least one relatively high permeability region bounded by at least one relatively low permeability region in a hydrocarbon-bearing formation matrix below an earthen surface penetrated by a wellbore in fluid communication with said at least one relatively high permeability region, the process consisting essentially of the steps of:
(a) preparing a gelation solution at the surface consisting essentially of a water-soluble carboxylate-containing polymer, a complex capable of crosslinking said polymer and formed of at least one electropositive chromium III species and at least one electronegative carboxylate species, and a solvent for said polymer and said complex;
(b) crosslinking said gelation solution substantially to completion at said earthen surface to form an injectable crosslinked flowing gel;
(c) injecting said gel into said wellbore; and
(d) displacing said gel into said at least one relatively high permeability region to substantially plug said at least one relatively high permeability region.

18. The process of claim 17 wherein said carboxylate species is selected from the group consisting of formate, acetate, propionate, lactate, lower substituted derivatives thereof, and mixtures thereof.

19. The process of claim 17 wherein said at least one relatively high permeability region is an anomaly and said at least one relatively low permeability region is a matrix.

20. The process of claim 17 wherein said at least one relatively high permeability region is a first zone of a matrix and said at least one relatively low permeability region is a second zone of a matrix.

21. The process of claim 17 wherein said carboxylate-containing polymer is a biopolymer.

22. The process of claim 17 wherein said carboxylate-containing polymer is an acrylamide polymer having an average molecular weight of about 2 million to about 10 million and a molecular weight distribution of about 0.02 to about 0.22 as determined by the ratio of $\sigma/\overline{M}$ wherein $\sigma$ is the standard deviation of molecular weight of abundance of a molecular species present in the polymer and $\overline{M}$ is the average molecular weight of the polymer.

23. A process for substantially reducing the permeability of at least one relatively high permeability region bounded by a relatively low permeability region in a hydrocarbon-bearing formation matrix below an earthen surface penetrated by a wellbore in fluid communication with said at least one relatively high permeability region, the process consisting essentially of the steps of:
(a) preparing a gelation solution at the surface consisting essentially of a water-soluble carboxylate-containing polymer, a complex capable of crosslinking said polymer, said complex formed of at least one electropositive chromium III species, at least one electronegative carboxylate species, and at least one species selected from the group consisting of electronegative oxygen species, electronegative hydroxide species, inorganic monovalent ions, inorganic divalent ions, water molecules, and mixtures thereof and a solvent for said polymer and said complex;

(b) crosslinking said gelation solution substantially to completion at said earthen surface to form an injectable crosslinked flowing gel;

(c) injecting said gel into said wellbore; and (d) displacing said gel into said at least one relatively high permeability region to substantially plug said at least one relatively high permeability region.

24. The process of claim 23 wherein said carboxylate species is selected from the group consisting of formate, acetate, propionate, lactate, lower substituted derivatives thereof, and mixtures thereof.

25. The process of claim 23 wherein said at least one relatively high permeability region is an anomaly and said at least one relatively low permeability region is a matrix.

26. The process of claim 23 wherein said at least one relatively high permeability region is a first zone of a matrix and said at least one relatively low permeability region is a second zone of a matrix.

27. The process of claim 23 wherein said carboxylate-containing polymer is a biopolymer.

28. The process of claim 23 wherein said carboxylate-containing polymer is an acrylamide polymer having an average molecular weight of about 2 million to about 10 million and a molecular weight distribution of about 0.02 to about 0.22 as determined by the ratio of $\sigma/\overline{M}$ wherein $\sigma$ is the standard deviation of molecular weight of abundance of a molecular species present in the polymer and $\overline{M}$ is the average molecular weight of the polymer.

29. A process for substantially plugging at least one relatively high permeability region bounded by at least one relatively low permeability region in a hydrocarbon-bearing formation below an earthen surface, said formation penetrated by a wellbore in fluid communication with said at least one relatively high permeability region, the process consisting essentially of the steps of:

(a) preparing a gelation solution at the surface consisting essentially of a water-soluble carboxylate-containing polymer, a complex capable of crosslinking said polymer and formed of at least one electropositive chromium III species and at least one electronegative acetate species, and a solvent for said polymer and said complex;

(b) injecting said gelation solution into said wellbore;

(c) displacing said gelation solution into said at least one relatively high permeability region; and (d) crosslinking said gelation solution substantially to completion in said at least one relatively high permeability region to form a crosslinked gel which substantially plugs said at least one relatively high permeability region.

30. A process for substantially plugging at least one relatively high permeability region bounded by at least one relatively low permeability region in a hydrocarbon-bearing formation below an earthen surface, said formation penetrated by a wellbore in fluid communication with said at least one relatively high permeability region, the process consisting essentially of the steps of:

(a) preparing a gelation solution at the surface consisting essentially of a water-soluble carboxylate-containing polymer, a complex capable of crosslinking said polymer and formed of at least one electropositive chromium III species, at least one electronegative acetate species, and at least one species selected from the group consisting of electronegative oxygen species, electronegative hydroxide species, inorganic monovalent ions, inorganic divalent ions, water molecules, and mixtures thereof, and a solvent for said polymer and said complex;

(b) injecting said gelation solution into said wellbore;

(c) displacing said gelation solution into said at least one relatively high permeability region; and (d) crosslinking said gelation solution substantially to completion in said at least one relatively high permeability region to form a crosslinked gel which substantially plugs said at least one relatively high permeability region.

31. A process for substantially reducing the permeability of at least one relatively high permeability region bounded by at least one relatively low permeability region in a hydrocarbon-bearing formation matrix below an earthen surface penetrated by a wellbore in fluid communication with said at least one relatively high permeability region, the process consisting essentially of the steps of:

(a) preparing a gelation solution at the surface consisting essentially of a water-soluble carboxylate-containing polymer, a complex capable of crosslinking said polymer and formed of at least one electropositive chromium III species and at least one electronegative acetate species, and a solvent for said polymer and said complex;

(b) crosslinking said gelation solution substantially to completion at said earthen surface to form an injectable crosslinked flowing gel;

(c) injecting said gel into said wellbore; and (d) displacing said gel into said at least one relatively high permeability region to substantially plug said at least one relatively high permeability region.

32. A process for substantially reducing the permeability of at least one relatively high permeability region bounded by a relatively low permeability region in a hydrocarbon-bearing formation matrix below an earthen surface penetrated by a wellbore in fluid communication with said at least one relatively high permeability region, the process consisting essentially of the steps of:

(a) preparing a gelation solution at the surface consisting essentially of a water-soluble carboxylate-containing polymer, a complex capable of crosslinking said polymer, said complex formed of at least one electropositive chromium III species, at least one electronegative acetate species, and at least one species selected from the group consisting of electronegative oxygen species, electronegative hydroxide species, inorganic monovalent ions, inorganic divalent ions, water molecules, and mixtures thereof and a solvent for said polymer and said complex;

(b) crosslinking said gelation solution substantially to completion at said earthen surface to form an injectable crosslinked flowing gel;

(c) injecting said gel into said wellbore; and (d) displacing said gel into said at least one relatively high permeability region to substantially plug said at least one relatively high permeability region.

* * * * *